United States Patent [19]

Gajjar

[11] Patent Number: 5,081,385

[45] Date of Patent: Jan. 14, 1992

[54] POLYPHASE MOTOR WITH ADJUSTABLE CLUTCH FOR SMOOTH START

[76] Inventor: Bhupendra M. Gajjar, 7 Modern Villa, 7th Road Santacruz East, Bombay 40055, India

[21] Appl. No.: 557,471

[22] Filed: Jul. 25, 1990

[51] Int. Cl.⁵ .................. F16H 57/00; H02K 7/108
[52] U.S. Cl. ............................. 310/78; 192/56 R; 464/46
[58] Field of Search ............. 192/0.02 R, 56 R; 310/77, 78; 403/258, 259, 260, 261; 464/42, 43, 46

[56] References Cited

U.S. PATENT DOCUMENTS

| | | | |
|---|---|---|---|
| 3,092,983 | 6/1963 | Huber | 464/46 |
| 3,478,238 | 11/1969 | Herman et al. | 464/46 |
| 3,798,990 | 3/1974 | Knappe | 464/46 |
| 4,292,557 | 9/1981 | Kishi | 310/78 |
| 4,588,913 | 5/1986 | Adami | 310/78 |
| 4,921,083 | 4/1990 | Etscheidt et al. | 192/56 R |

Primary Examiner—Steven L. Stephan
Assistant Examiner—D. L. Rebsch
Attorney, Agent, or Firm—Richard L. Miller

[57] ABSTRACT

A polyphase induction motor prevents the transmission of excessive torque to the load upon starting of the motor by connecting a pair of friction clutches between the rotor of the motor and the power shaft. When a torque higher than the pressure on the clutches occurs, the clutches will slip, permitting the output shaft to rotate at a lower speed than the rotor. An adjustment varies the pressure of a spring pressing on the clutches to adjust the torque at which slippage of the clutch occurs.

7 Claims, 2 Drawing Sheets

POLYPHASE MOTOR WITH ADJUSTABLE CLUTCH FOR SMOOTH START

BACKGROUND OF THE INVENTION

1. Field of the Invention.

This invention relates to polyphase motors, and more particularly to a clutch connected between the rotor and the output shafts of the motor for allowing the output shaft to slip thereby preventing the transmission of excessive torque to the load upon start up of the motor.

2. Description of the Prior Art.

Polyphase induction motors, particularly three phase motors, are very common because of their simple construction, efficiency, good speed regulation and low cost. Such motors come in all sizes and find wide use where polyphase power is available. Both squirrel-cage and wound rotor machines are in common use because both can be designed for two phase or three phase current, the wound rotor type providing both high starting torque and good speed regulation and being the most common type for high power applications.

An inherent problem with such motors is their start up. Some motors of this type reach their maximum speed in a second, and the torque applied by the power output shaft an the downstream components is very high, at times 600% of the rated torque of the motor As a result, the downstream components are usually built heavier than necessary, and thus are more costly, in order to absorb the start up 'jerk' of the motor.

The prior art has attempted to eliminate or lessen this problem by using a rheostat to limit the starting current drawn from the power supply to a value less than that required by the motor in order to bring the motor up to speed by gradually reducing the resistance, but this method is inherently inefficient and converts the motor into an essentially variable-speed motor rather than an essentially constant-speed motor. Other means for controlling torque or speed are well known, but none use the teachings of the present invention.

This invention provides a clutch connected between the power output shaft and the rotor which will slip and permit the shaft to run at a lower speed than the rotor and thereby limit the power transmitted to the downstream components when the motor is starting up. A representative power output would be 150% of rated torque. Since the maximum torque that may be transmitted to downstream components is thereby limited, the components need not be designed to withstand a high load, but can be decreased in size and ruggedness, thus considerably reducing the cost of such components.

It is an object of the present invention to provide a clutch connecting the rotor and the output shaft of a polyphase motor to prevent the output shaft from transmitting more than a preselected torque to downstream components.

Another object of this invention is a clutch connected between the rotor and output shaft of a polyphase motor which permits the output shaft to slip and run at a lower speed than the rotor when the output shaft produces a torque higher than a preselected value.

A further object of this invention is the use of a friction clutch at each end of the rotor of a polyphase motor which prevents excessive power being applied to the load upon start up of the motor.

A still further object of his invention is an adjustable clutch between the rotor and output shaft of a motor, and an adjustable spring means for varying the torque conditions at which slippage occurs.

SUMMARY OF THE INVENTION

In accordance with a preferred embodiment of this invention there is provided a polyphase motor of a conventional type having a rotor and a stator. The rotor surrounds the output shaft which is connected through a pair of friction slip clutches at the ends of the rotor to rotate with the rotor and deliver power from the motor to a load during normal operation. However, when a preselected load such as 150% of rated load is exceeded as when the motor is started up, the clutches will slip and the output shaft will not exceed the maximum torque. In this condition the rotor will rotate faster than the shaft. An adjustable spring controls the axial forces on the clutches and may be adjusted via a movable set screw, so that the load point at which slipping will occur may be adjusted.

BRIEF DESCRIPTION OF THE DRAWING FIGURES

The figures in the drawings are briefly described as follows:

FIG. 1 is a perspective view of a typical motor incorporating the present invention; and FIG. 2 is a a diagrammatic axial cross sectional view taken through the motor assembly; and FIG. 3 is an exploded view illustrating the rotor clutch mechanism; and FIG. 4 is a cross sectional view taken along line 4—4 of FIG. 3 showing the clutch compression spring.

DESCRIPTION OF THE PREFERRED EMBODIMENT

Figure 1:
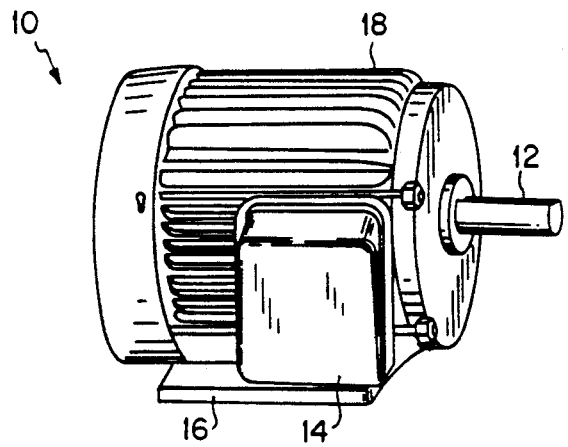

Referring to FIG. 1 there is shown a typical polyphase motor 10 having a shaft 12 which rotates to transmit power to a load, not shown. A terminal box 14 is connected to a source of power, not shown, and may contain circuitry to maintain motor speed and voltage and/or thermal protection etcetera. The motor sits on a base 16.

Figure 2:
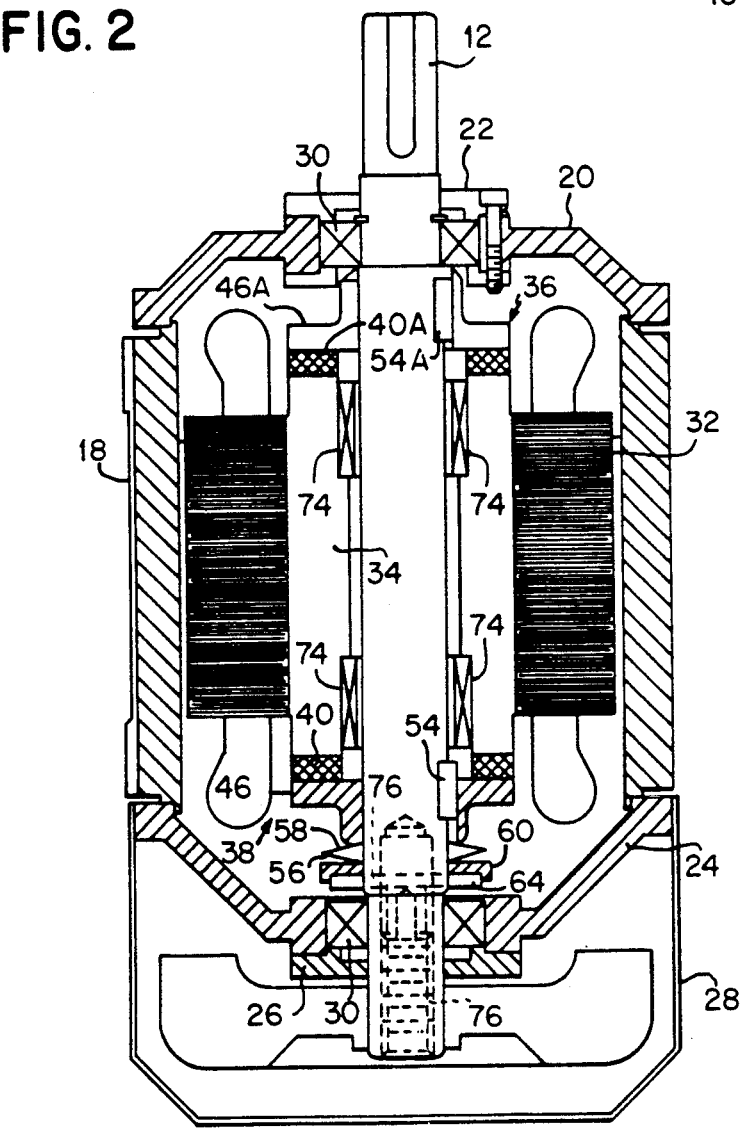

FIG. 2 shows the motor in cross section. The casing is conventional and consists of a finned body 18 designed to dissipate heat, a front wall 20 with a cover plate 22, a rear wall 24 with a cover plate 26, and an end cap 28. Shaft 12 is supported by bearings 30 adjacent to front and rear walls 20 and 24.

A wound stator 32 produces a rotating magnetic field when supplied with balanced polyphase voltages, causing voltages to be induced in a rotor or armature 34 producing a force and causing rotation of rotor 34. Shaft 12 is connected for rotation with rotor 34 through disk friction clutches 36 and 38 as shown in FIGS. 3 and 4.

Figure 3:
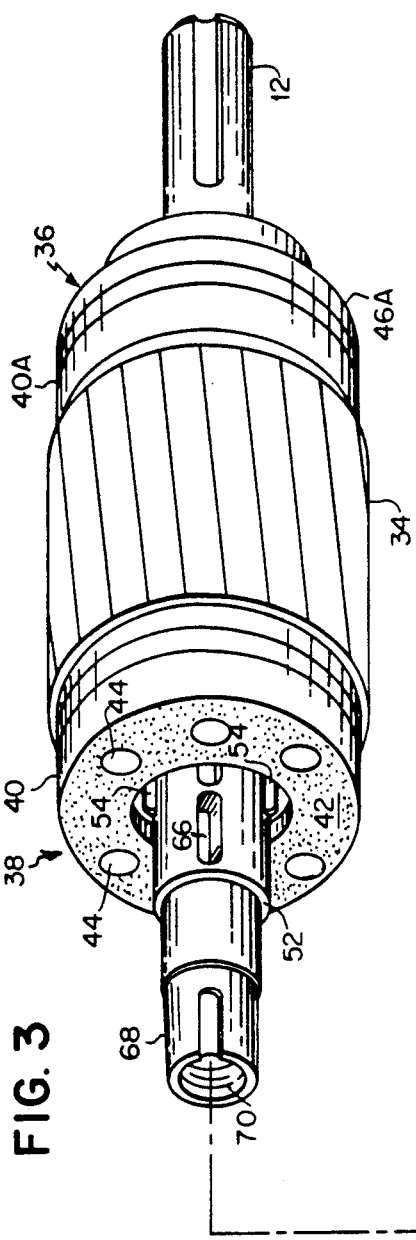
Figure 4:
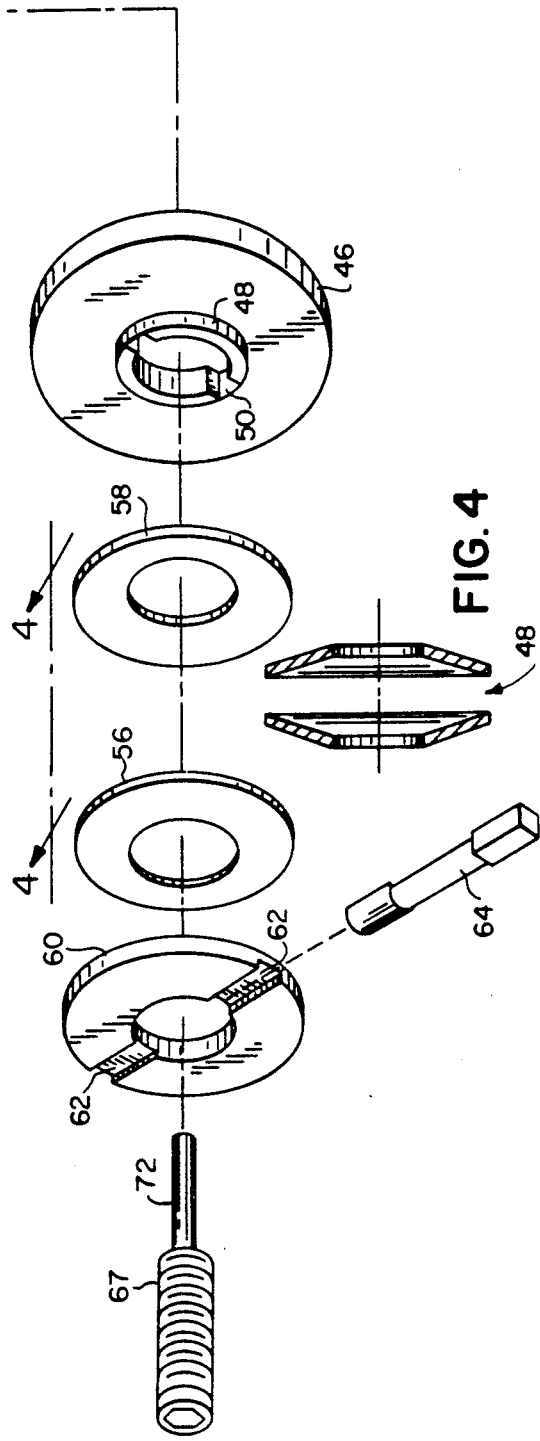

Referring to FIGS. 3 and 4, a disk 40 having clutch material 42 on its surface is affixed to the end of rotor 34 such as by screws or other appropriate bonding mechanism or adhesive well known in the art, not shown, located in recessed openings 44. A disk 46 having a collar 48 with slots 50 is fitted on portion 52 of shaft 12 with slots 50 fitting on keying members 54 located on opposite sides of shaft portion 52. The side of disk 46 adjacent to disk 40 may also alternately be coated with clutch material 42, instead of the end of rotor 34. The disks 40 and 46 form a friction clutch 36. A second friction clutch 26 is formed at the other end of rotor 34, with disk 46A fitting on keying members 54A and engaging disk 40A (See FIG. 2).

A spring is formed by concave washers 56 and 58 having their concave sides abutting. The spring presses disk 46 against disk 40. A washer 60 having a pair of opposing slots 62 pushes against the convex side of washer 56. The washer 60 and the spring formed by washers 56 and 58 fit on portion 52 of shaft 12, and washer 60 is held in place by a key 64 which fits through axially extending keyway 66 in portion 52 of shaft 12. A headless set screw 67 is screwed via international threads 70 into portion 68 of shaft 12 with end 72 of set screw 67 pressing against key 64 to force washers 60, 56 and 58 against disk 46. Tightening set screw 67 increases the axial force on the spring formed by washers 56 and 58 and thus changes the torque at which the disks 40 and 46 of clutch 38 will slip. Disks 40A and 46A of clutch 36 will have the same axial forces applied thereto, and will slip at the same torque.

Referring again to FIG. 2 when the torque applied to shaft 12 by rotor 34 via disks 46 and 46A and keying members 54 and 54A, and by the load on shaft 12, exceeds the friction of clutches 36 and 38, the clutches will partially disengage and shaft 12 will slip relative to rotor 34 and only the amount of power to which the clutches are preset will be transmitted by shaft 12 to the downstream components. Rotor 34 will rotate at a faster speed than shaft 12 on needle bearings 74 located between rotor 34 and shaft 12.

Thus, upon adjustment of set screw 67, the motor 10 can be set to supply only the desired torque such as 150% of rated power to the load, and any torque above the set point such as upon starting of the motor 10 will cause the clutches 36 and 38 to slip.

The location of the set screw 67 and key 64 are shown in FIG. 2 by dotted lines 76.

In FIG. 4 reference numeral 48 shows the spring formed by washers 56 and 58 in section before the spring is compressed.

While certain novel features of this invention have been shown and described and are pointed out in the annexed claims, it will be understood that various omissions, substitutions and changes in the forms and details of the device illustrated and in its operation can be made by those skilled in the art without departing from the spirit of the invention.

What is claimed is:

1. In a polyphase motor having a stator, a rotor rotatable with respect to said stator, and an output shaft rotatable with said rotor for providing rotatory power to a load connected with said shaft, the improvement comprising:
    a) clutch means connecting said rotor and said output shaft and comprising a first pair of discs connected respectively to opposite ends of said rotor, said discs having a central opening therein through which said output shaft passes, each of said pair of discs having friction enhancing material applied to the outer face thereof;
    b) a second pair of discs connected respectively to opposite ends of said rotor, said discs having a central opening therein through which said output shaft passes, each of said second pair of discs having its inside face located respectively adjacent to and operatively connected with the respective outside face of said first pair of discs whereby each pair of adjacent discs forms a friction clutch mechanism; and
    c) means for mounting said second pair of discs on said output shaft for rotation at the same speed as said output shaft, said clutch means fully engaging and permitting said output shaft to be connected directly to said rotor for rotation therewith when the rotary power transmitted by said output shaft to the load is less than a preselected amount, said clutch means partially disengaging to permit said output shaft to slip relative thereto and rotate more slowly than said rotor and thereby limit the rotary power transmitted to the load by said output shaft to said preselected amount when the power output of said shaft increases to said preselected amount; and
    d) adjusting means connected with and compressing said clutch means for varying the preselected amount of rotary power transmitted by said output shaft to the load at which said clutch means partially disengages.

2. A polyphase motor according to claim 1 wherein the adjusting means is set so that the clutch means will partially disengage at 150% of rated torque.

3. A polyphase motor as in claim 1 in which the face of said second pair of discs mounted adjacent to the outside face of said first pair of discs has friction enhancing material thereon.

4. A polyphase motor as in claim 1 in which said means for mounting said second pair of disks upon said output shaft comprises
    a) first and second pairs of raised keying members on the surface of said output shaft, each of said pair of keying members being located diametrically opposite the other of said pair of keying members, each said pair of keying members extending a short distance axially along said shaft a short distance to either side of each of said second pair of disks; and
    b) a pair of diametrically opposed slots located in the central opening of each of said second pair of disks adapted to receive said raised keying members when said disks are mounted on said shaft.

5. A polyphase motor as in claim 2 in which said adjusting means comprises
    a) a spring means having first and second ends mounted concentrically on said output shaft with the first end thereof in contact with the outside face of one of said friction clutch mechanisms;
    b) a compression disk having a central opening therein through which said shaft passes, said compression disk being mounted on said shaft in contact with the second end of said spring means, said compression disk having a slot extending diametrically from a first point on the outside of said compression disk to a second point on the outside of said compression disk diametrically opposite said first point;
    c) said shaft means containing a keyway extending diametrically therethrough immediately adjacent the outside face of said compression disk and extending axially a short distance in both directions;
    d) a key adapted to fit within said keyway and fit within the slot in said compression disk; and
    e) screw means adapted to fit within one end of said shaft with its end pushing against said key and thereby pressing said compression disk against said spring to apply pressure to said friction clutch mechanisms and prevent said clutch mechanisms from slipping at a torque beneath a predetermined value on said output shaft, said screw being adjustable within the end of said shaft to vary the pressure applied by said compression disk upon said spring.

6. A polyphase motor as in claim 5 in which said spring means comprises first and second concave disks with the concave side of each disk facing and in contact with the concave side of the other said disk.

7. A polyphase motor as in claim 6 in which said screw means is a headless set screw adapted to be adjustable within the inside of a hollow end of said shaft having internal threads therein.

* * * * *